Patented Oct. 22, 1935

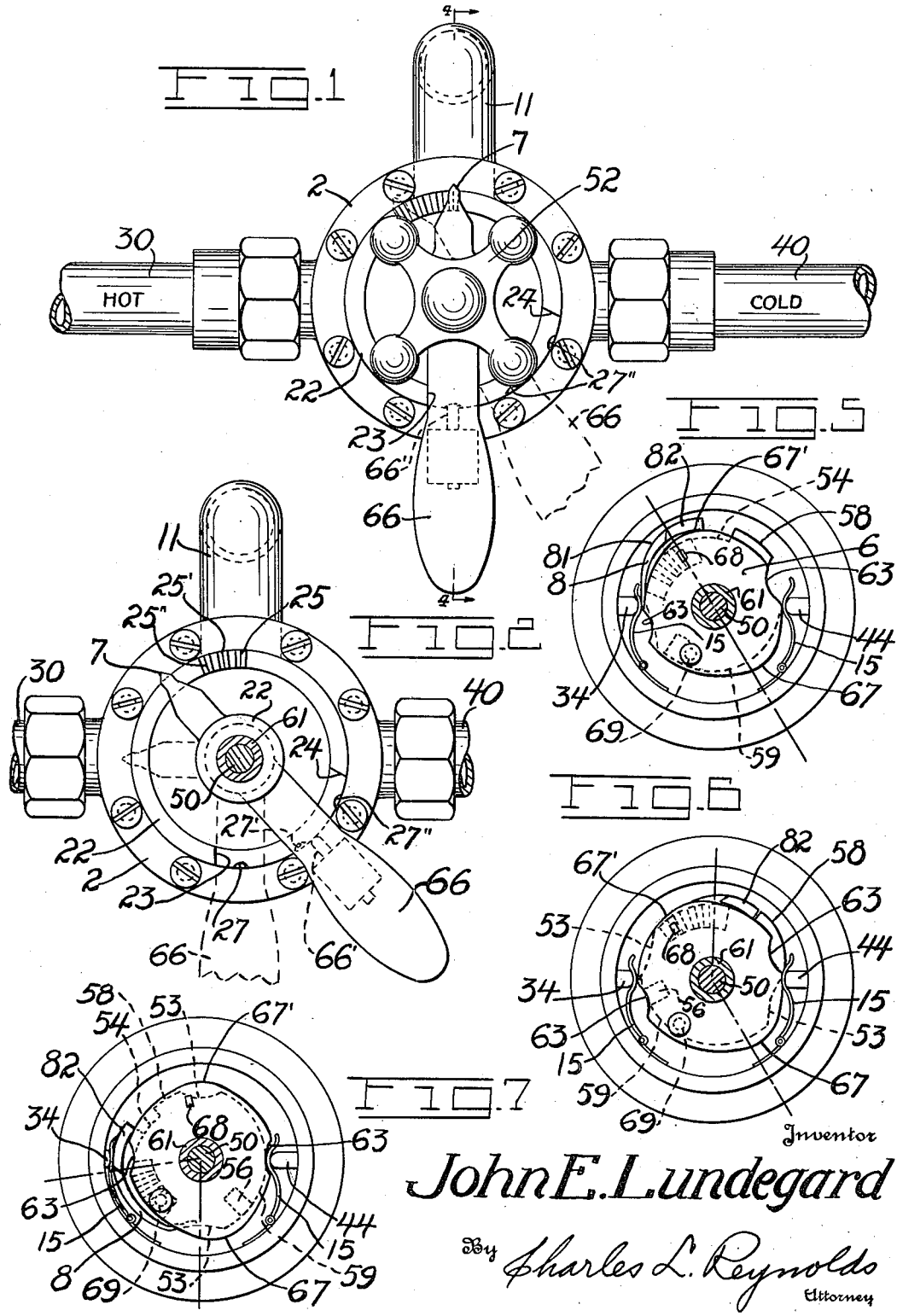

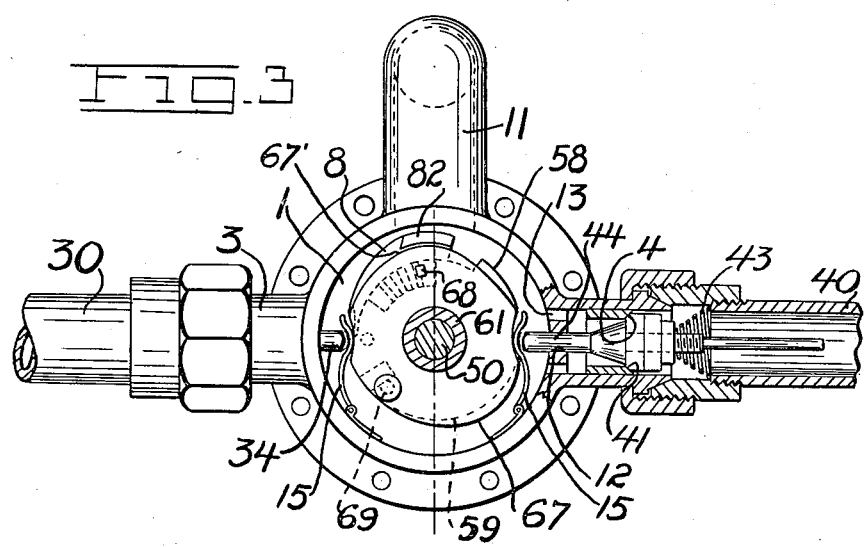
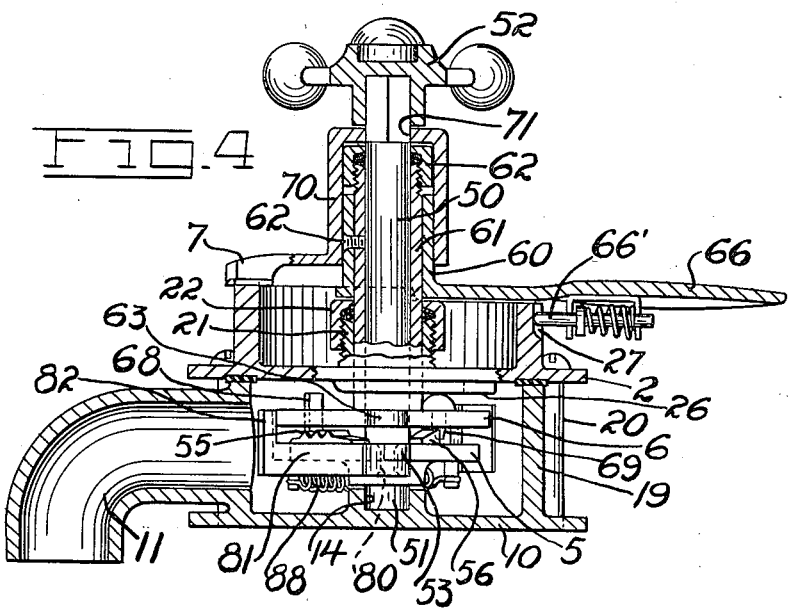
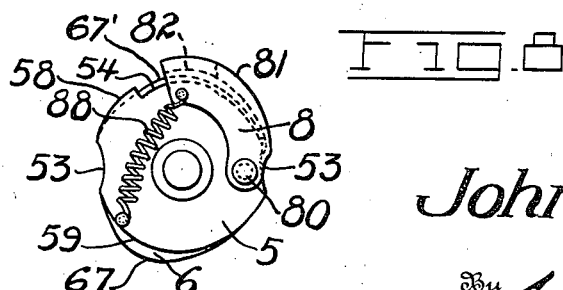

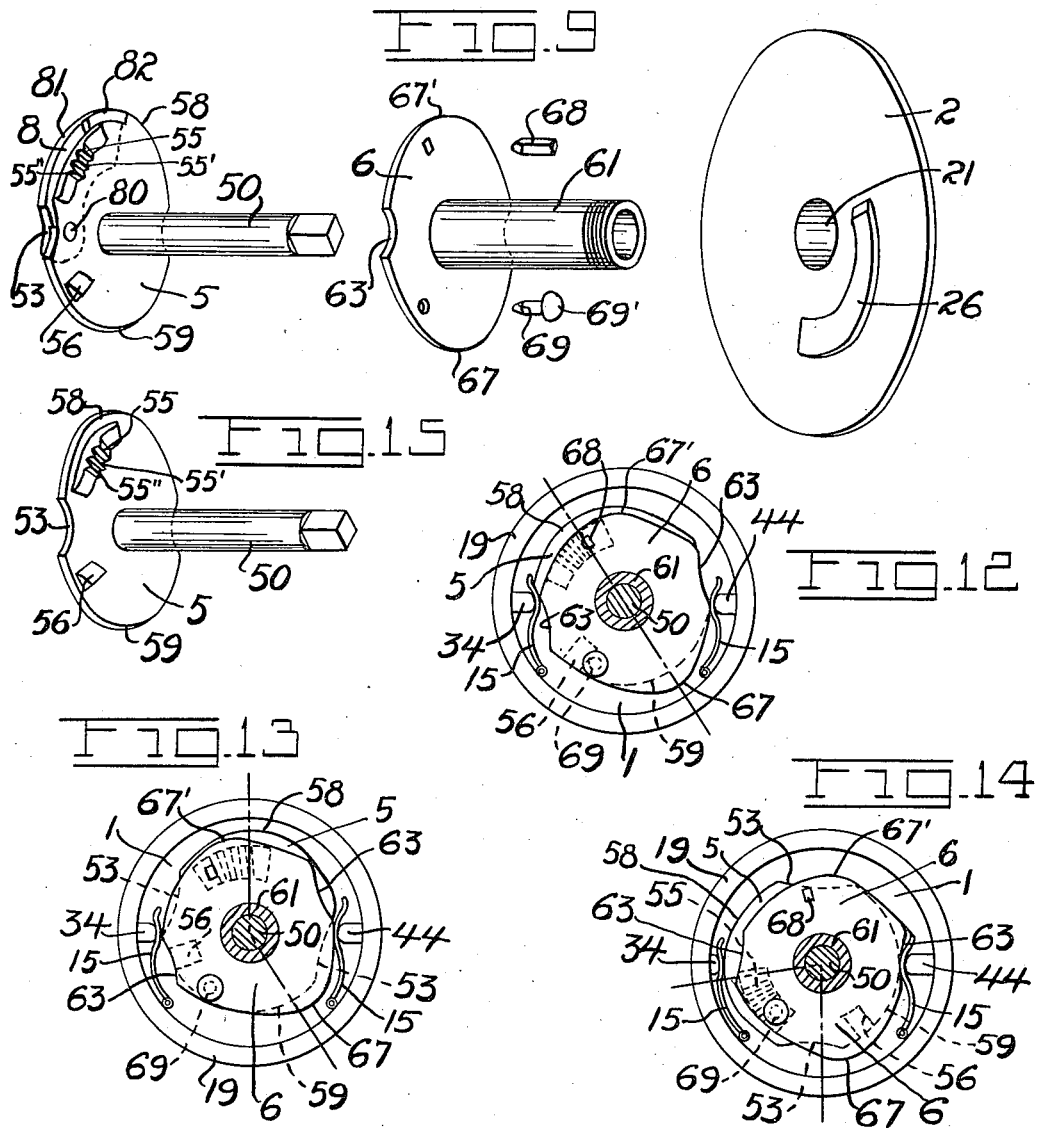

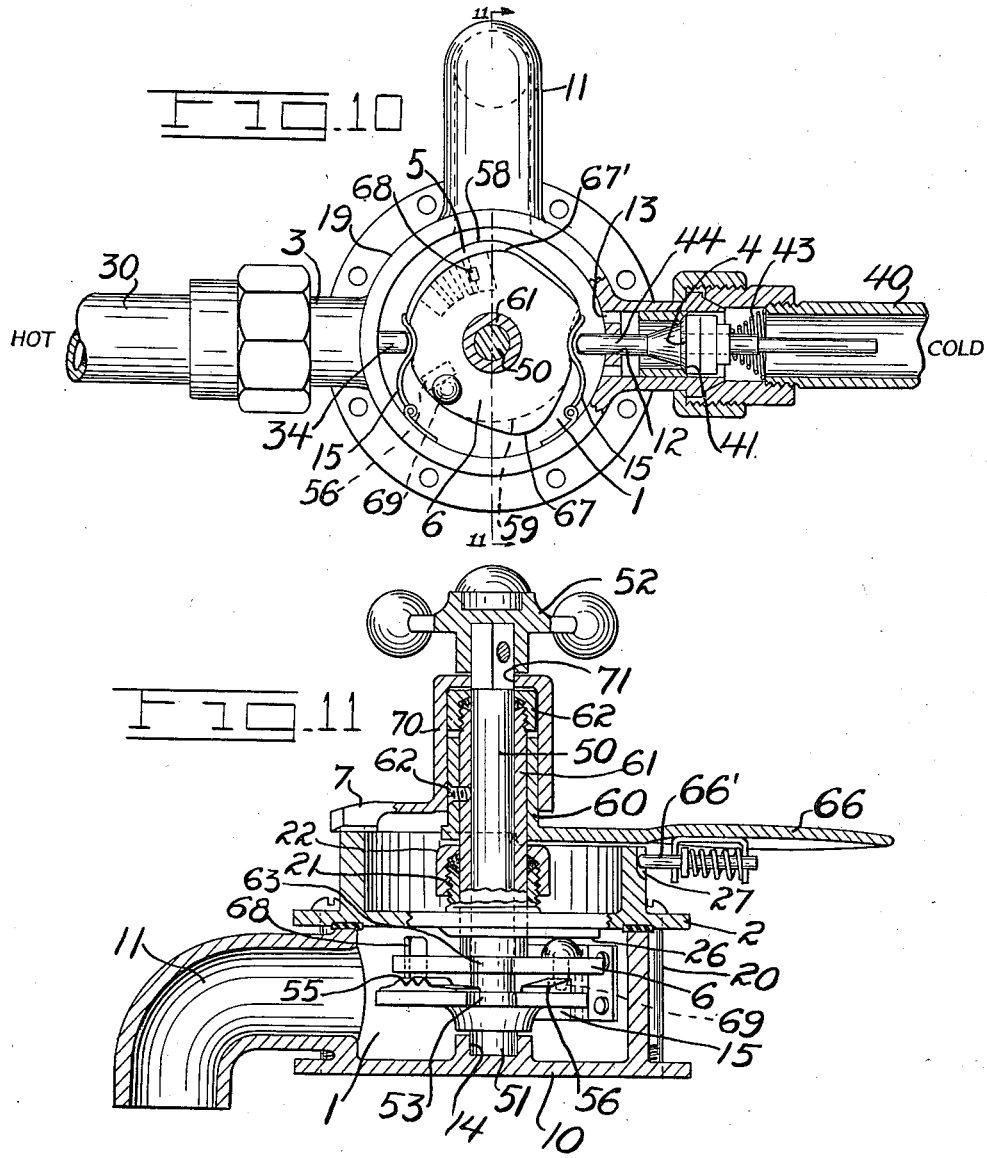

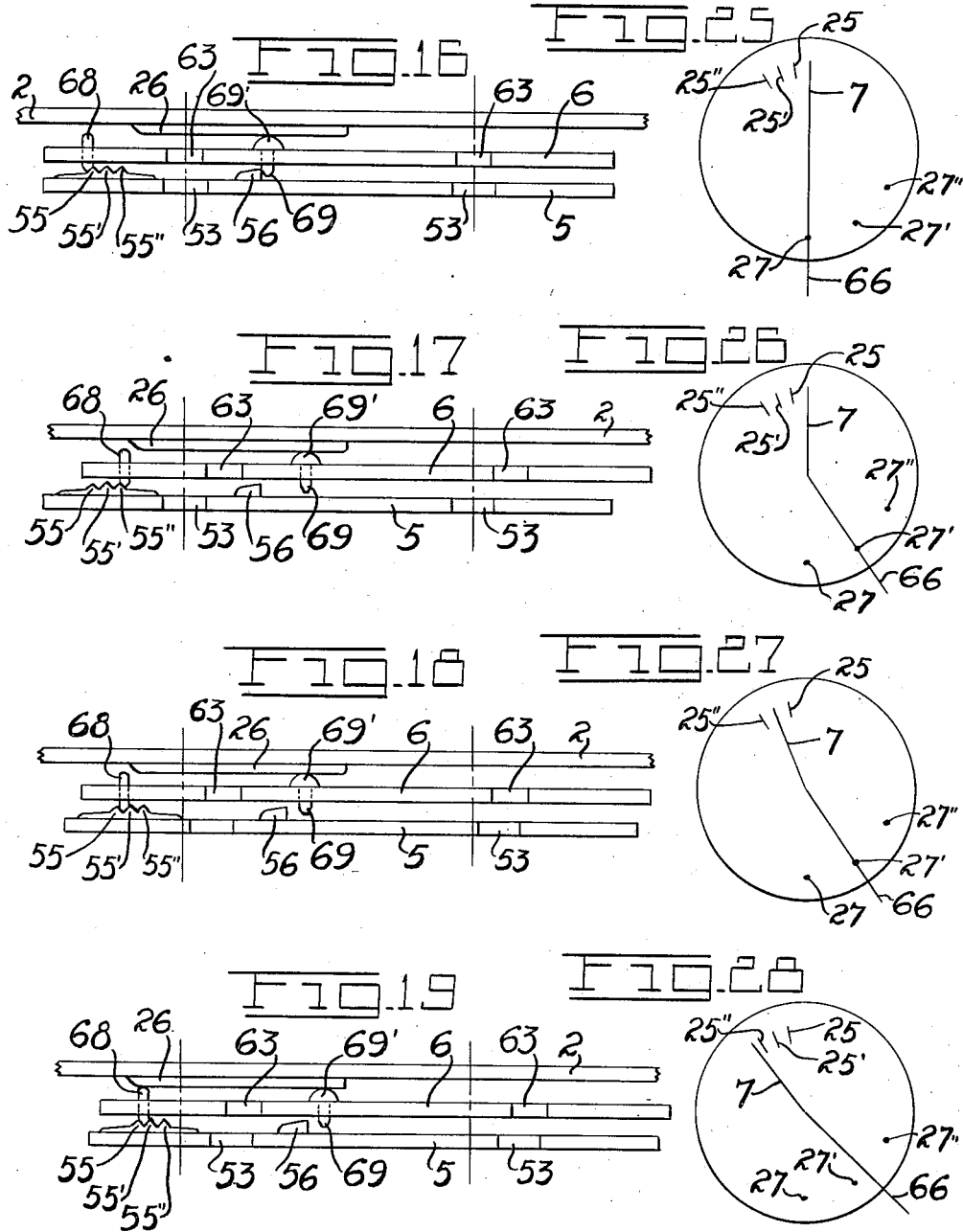

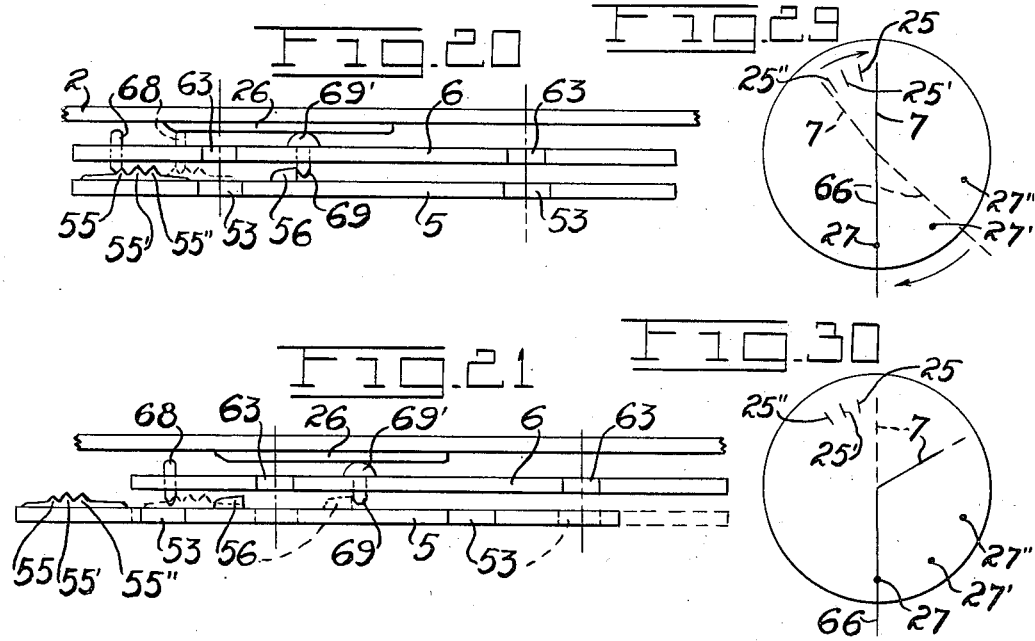

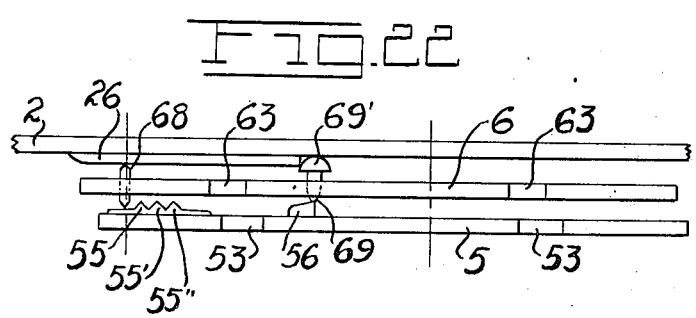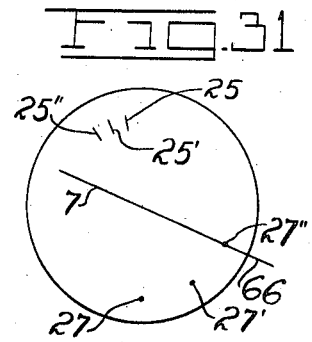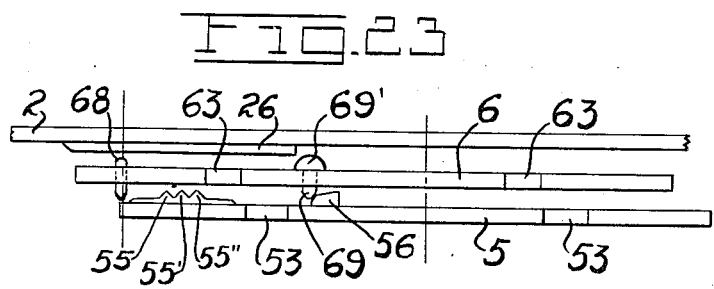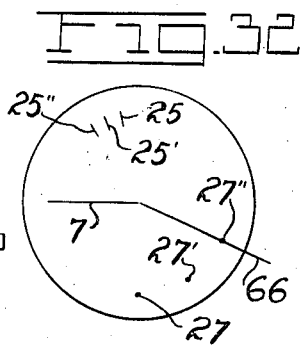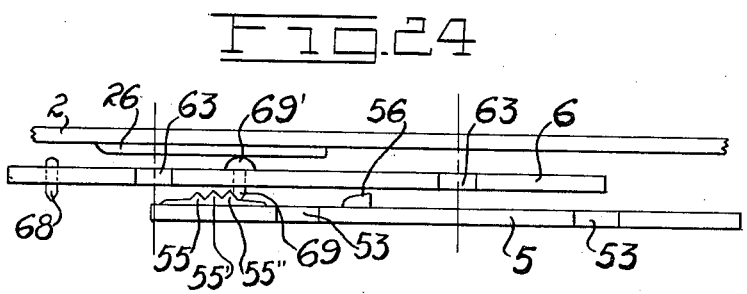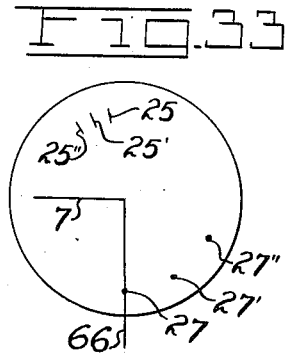

2,017,864

UNITED STATES PATENT OFFICE 2,017,864

MIXING VALVE

John E. Lundegard, Bremerton, Wash.

Application February 16, 1932, Serial No. 593,295

13 Claims. (Cl. 277—18)

My invention relates to devices for mixing and discharging two liquids,—for instance, hot water and cold water—these devices being generally designated mixing valves.

The principal object of my invention is to provide a valve of this character, by means of which the user may control at will the ratio of hot water to cold water—that is, the temperature ratio or temperature mixture—and may also control the volume of the mixture discharged, the temperature control and the volume control being independent of each other, so that any temperature mixture can be obtained, and then any volume of the mixture at that temperature can be delivered without altering the temperature of the mixture.

It is another object of my invention to provide means in such a valve to insure a sufficient supply of cold water prior to or coincident with the flow of hot water, so that the user may not unawares turn on the full volume of hot water and scald himself, and further, to provide means to prevent accidental delivery of all hot water without admixture of cold water, whether in turning on the water or turning it off.

It is another object to provide such a valve wherein, by proper manipulation, all cold water can be obtained, or, in another instance, all hot water can be obtained.

It is another object to provide a valve having the advantages and capabilities indicated above, which is entirely mechanically controlled, and which can be constructed of few and simple parts, and which will thus be not likely to get out of order and will withstand hard and long usage, and which will be inexpensive and therefore capable of being placed in general use.

It is particularly an object to eliminate reliance upon a thermostat to control the temperature mixture.

My invention comprises the novel parts, and the novel combination and arrangement thereof, as shown in the accompanying drawings, and as will be more particularly described in this specification and defined by the claims which terminate the same.

In the accompanying drawings I have shown my invention embodied in preferred mechanical forms, and have illustrated the principles of and stages in its operation by diagrams.

Figure 1 is a plan view of my valve with the operating handles both in the off position.

Figure 2 is a similar view, showing the operating handles advanced.

Figure 3 is a part plan and part sectional view, the cover plate being removed, showing the position of the operating cams in the off position.

Figure 4 is a vertical axial section substantially on the line 4—4 of Figure 1.

Figures 5, 6 and 7 are plan views of the cam arrangements and their relationship to the valve stems, in various positions.

Figure 8 is a bottom plan view of the cams in a preferred construction.

Figure 9 is an exploded perspective view of the preferred form of cam with the associated cover plate.

Figure 10 is a view similar to Figure 3, and Figure 11 is a view similar to Figure 4, illustrating a modified cam form.

Figures 12, 13 and 14 are views similar to Figures 5, 6 and 7, likewise illustrating the modified cam arrangement.

Figures 15 to 24 inclusive are diagrammatic representations or developments of my cam and cover plate, showing the various relative positions of different operating positions, and Figures 25 to 33 inclusive are diagrammatic plan views of the operating handles in the positions corresponding to the positions shown in Figures 15 to 24, respectively.

The mixing chamber 1, comprising the bottom 10, walls 19, and cover plate 2 held in place by the screws 20 or other suitable means, has an inlet connection 30 for hot water, and 40, diametrically opposite in the arrangement shown, is a cold water connection. The common discharge outlet is at 11. The hot water valve 3 and the cold water valve 4 may be identical in construction. Thus the stem 44 of the valve 4 is received in the guide aperture 12 of a spider 13 through which the hot water passes when the valve is lifted from its seat 41. A spring 43 tends to maintain the valve seated, this spring extending between the valve and the end of the connecting pipe at 40, or being otherwise suitably held in place. The stem 44 projects into the chamber 1, and similarly the stem 34 of the hot water valve 3 projects into this chamber.

Within the chamber are provided means for controlling the opening of the valve, and prior to the description of the operation of the valve, the construction of these control means will be explained.

Two cams are employed, the cam 5 which with its associated valve 3 may be designated the hot water governor, and the cam 6 which with its associated valve 4 may be designated the cold water governor. An extension cam 8 may be supported from the hot water cam 5, this being adjustable, as will be made clear hereinafter. The hot water cam 5 is provided with a stub end 51 received in a socket 14 in the bottom 10 of the casing, and a stem 50, aligned with the stub end 51, extends upwardly through the top 2 of the casing to a point where it may have fitted upon its squared upper end a control handle 52. In order that the operator may know the position of the cam, a sleeve 70 is likewise secured upon the squared end of the stem 50, it being provided with a correspondingly shaped aperture 71, and this sleeve carries an indicator 7.

The cam 6 is rotatable about the stem 50, and is provided with an upstanding sleeve 61 which passes through the cover plate 2, leakage being prevented by a packing nut 22 threaded upon the stub 21 of the cover plate. Above the cover plate, and secured by a set screw 62 to the sleeve 61, is a sleeve 60 forming part of a control handle 66. The control handle indicates and controls, as well, the position of the cam 6.

The extension cam 8 is pivotally supported at 80 (see Figure 8 upon the under side of the hot water cam 5. An upstanding lug 82 engages the periphery of the cold water cam 6, and the cam 8 is drawn inward by a spring 88. The cam 5, when the extension cam 8 is used, is cut away, as may be seen in Figure 8 so that under certain conditions the cam 8 may seat against the periphery of the cam 5 and form a continuous cam surface therewith. At other times the periphery 81 of the cam 8 increases the inclination of the periphery of the cam 5.

Each of the cams 5 and 6 has a pair of opposite recesses, 53 in the one instance and 63 in the other, which, when the cam is in the off position, is disposed in line with the respective stems 34 and 44 of the hot and cold water valves. There should be no contact at such time between the stems and the cams, and accordingly the valves are seated under the influence of the springs 43. The stems, however, are not broad enough, or preferably are not so made, as to contact with both of the cams 5 and 6 in any event, and in order that these stems may be controlled by each of these cams, as the occasion requires, flat plates 15, supported within the chamber 1, are interposed between both cams and each of the stems 34 and 44; these plates may be hingedly or otherwise supported to move substantially radially under the influence of the cams, thereby to move the valve stems.

The hot water cam 5 has formed thereon certain teeth 55, 55' and 55'', and slidably received in an aperture of the cold water cam 6 is a pin 68 which, when prevented from rising, will engage the teeth mentioned, and will lock the cams together for simultaneous movement at such relative adjustment as may then be attained. Similarly, the hot water cam 5 has a lug 56 which may engage a pin 69 supported in the cold water cam 6, if the pin be not permitted to rise, to turn the cold water cam as the hot water cam is turned in one direction. As a means of holding the pins 68 and 69 in locked position, so that they cannot rise and disengage from the corresponding members on the hot water cam 5, the cover plate 2 has, in a proper location, a cam surface which, to distinguish it, may be termed a ledge 26.

Associated with the control handle 66 are stop shoulders 23 and 24 forming part of the cover plate 2 and limiting movement of the control handle 66. A spring pressed plunger 66' may in certain positions engage within notches 27, 27' and 27''. Similarly, the pointer 7 cooperates with teeth or index marks 25, 25' and 25'', also formed upon the cover plate 2.

In the form shown stems 34 and 44 assume a conical shape adjacent to their respective valves. These cones, cooperating with the valve seats, restrict the water supply opening formed when valves 3 and 4 are opened, and such restriction is decreased in direct proportion to the amount of movement of the respective valves from closed position. The flow of water past the valve seats is, therefore, in the form shown, directly proportional to the movement of the valves, produced by operation of their respective cams on the valve stems.

Let us refer now to Figures 16 to 33 inclusive, which illustrate the various operations possible in the use of this valve. In Figures 16 and 25 the parts are shown in the off position. The depressions 53 and 63 in the cams are in alignment with each other and in registry with the respective valve stems 34 and 44. As a result, each of the valves 3 and 4, controlling the hot and cold water respectively, is closed.

Now it is desired to deliver a mixture of hot and cold water. The control handle 66 and the cold water valve 6 operated thereby must first be moved to what may be termed the setting position—that is, the plunger 66' is brought into registry with the middle notch 27' (see Figures 17 and 26). This moves the cam 6 relative to the cam 5, and the pin 68, which is free to move vertically, moves over the teeth 55, 55' and 55'' until it is near the ledge 26. The pin 69 with its head 69' moves away from the lug 56. The effect of this is to move the high point 67 of the cold water cam 6 counter-clockwise towards the stem 44 of the cold water valve, with the result that the cold water valve is opened and cold water is delivered in small amounts from the discharge spout 11.

But it is the wish to deliver a mixture of hot and cold water. Consequently the next step is to adjust the temperature relationship between hot and cold water, this being done as illustrated in Figures 18 and 27. The cold water cam 6 is held in position by the engagement of the plunger 66' with the notch 27', and the control handle 52 is rotated to advance the hot water cam 5 likewise counter-clockwise, and to bring back certain of the teeth 55, 55' and 55'' under the pin 68, but to leave the pin eventually in the valley between two of these teeth. While only three teeth are shown, obviously any suitable number may be employed. Parts may now be in the position of Figures 18 and 27, and the periphery 81 of the cam 8, moving in conjunction with the hot water cam 5, has now come opposite the stem 34 and hot water commences to be delivered. Note that cold water was delivered before or coincident with the hot water, so that scalding hot water could not be delivered alone.

The volumes thus delivered are small, and the next operation is to increase the volume, still maintaining the temperature mixture, that is the ratio of hot water volume to cold water volume which has been attained. Adjustment for total volume is accomplished by moving both the handles 52 and 66 a further amount counter-clockwise and simultaneously to a position such as shown in Figures 19 and 28. This simultaneous movement maintains the pin 68 in contact with the teeth 55, 55', and moves the pin 68 beneath the ledge 26. Now it cannot rise, and movement of both valves may now be accomplished by counter-clockwise movement of either control handle 52 or 66. Such counter-clockwise movement will have the effect of increasing the volume without in any way changing the temperature mixture.

To turn off the water it is only necessary to turn the cold water cam 6 and its control handle 66 in a clockwise direction until the handle contacts with the shoulder 23. So long as the pin 68 is in contact with the ledge 26 the two cams are locked together for movement, and when the pin 68 passes beyond the end of the ledge 26 there will be a certain amount of movement of the cam 6, without corresponding movement of the cam 5, but immediately the pin 69, held down by contact of its head 69' with the ledge 26, engages the lug 56 (see Figure 20) the continued movement of the cam 6 will cause movement of the cam 5 until eventually parts will reach the position illustrated in Figure 16, which, it will be remembered, is the off position.

It will be observed in both opening and closing the valve there is no possibility of supplying all hot water, but first cold water is supplied, or at least a mixture of hot and cold water, so that the user cannot accidentally be scalded by a rush of hot water alone. The hot water is turned off before the cold water is turned fully off. The movement from on to off position is illustrated in Figures 20 and 29.

Figures 21 and 30 illustrate the operation to deliver all cold water. In this instance the cold water valve 4 is operated not by the cold water cam 6, but rather by the curvature at 58 of the hot water cam 5 which is disposed opposite that curvature which operates the valves as previously explained in delivering a mixture. The cam surfaces of the cam 5 (coupled with the aligned surfaces of the cam 8, when the latter is used) are so arranged that by turning this cam clockwise it will unseat the cold water valve 4, but will not affect the hot water valve 3, for, as may be seen in Figure 6, for instance, that portion 59 of the hot water cam 5 which would thus be brought opposite the stem 34 of the hot water valve as the cam is rotated clockwise is concentric with the axis of rotation of the cam.

As shown in Figures 21 and 30, then, the delivery of all cold water is effected from the off position merely by turning the hot water cam 5 clockwise, opposite to its normal opening movement, leaving the cold water cam 6 unturned. The more the cam 5 is turned from the off position in a clockwise direction, the larger volume of cold water is delivered. Thus while the cam 5 has heretofore been called the hot water cam, and will be so designated hereafter to distinguish it from the cam 6, it is clear that this cam controls the delivery of both hot and cold water under proper circumstances.

At times it is desirable to permit the delivery of hot water unmixed with cold water. Since it is still not desirable to permit this without first turning on a mixture so that the user may not be scalded, and so that he may not accidentally operate the valve to deliver all hot water, the operation shown in Figures 22 to 24 and 31 to 33 is required. The two cams are turned jointly counter-clockwise substantially to the limit of movement of the hot water cam 5, at which time the handle 66 is brought up against the shoulder 24, and in this position the head 69' of the pin 69 passes beyond the end of the ledge 26, and the pin is now free to move upwardly. Now it is possible to move the lug 56 underneath and past the pin 69, the pin yielding, as shown in Figure 23, to permit this, and now the cold water cam 6 can be moved back to the off position, as shown in Figures 24 and 33, leaving the hot water cam 5 turned counter-clockwise to the limit of its movement, thus giving a full flow of hot water only. Of course, the hot water cam 5 can be turned back from this position as much as is desired to regulate the volume of hot water delivered. To return parts to the normal off position it is necessary to move the cold water cam 6 back to the position of Figures 23 and 32, and a little beyond, to pass the pin 69 to the right hand side of the lug 56, and then both the cams can be returned to the off position.

The form which omits the extension cam 8, and which is illustrated in Figures 10 to 15 inclusive, is substantially identical with that already described. With the extension cam, however, the inclination of the cam surface is increased at certain times by the interaction of the cams 8 and 6, and is decreased at other times, which is desirable but not at all essential.

It is believed that the construction and operation of the valve will now be clear, and it will be observed that the control is entirely mechanical, not relying upon any thermostatic element to control temperature, but that the control is entirely within the facilities of the operator, and, furthermore, that it is not possible accidentally to deliver hot water, nor in any event to deliver hot water without first discharging a mixture of hot and cold water.

What I claim as my invention is:

1. In a mixing valve, in combination with a chamber connected to hot and cold water supply sources and having a common discharge outlet, two valves controlling the admission to the chamber from the respective sources, and separate means governing the opening of each valve, that means governing the hot water valve being also operable to govern initially the cold water valve, and each means being individually operable, following the initial operation, whereby, by their conjoint effect, to supply all variations, from all hot to all cold water.

2. In a mixing valve, in combination with a chamber connected to hot and cold water supply sources and having a common discharge outlet, hot and cold water valves controlling the supply from the respective sources, a member adjustable to open and control the hot water valve, and a second member interlocked during opening movement with the first member to move therewith, said second member being operable by such movement to open the cold water valve, and said second member being thereafter releasable from the first member, to open or to close independently.

3. In a mixing valve, in combination with a chamber connected to hot and cold water supply sources, and having a common discharge outlet, hot and cold water valves controlling the supply from the respective sources, a member adjustable to open and control the hot water valve, a second member adjustable relative to the first member, and disposed to open and control the cold water valve, and means to interlock the two members at a plurality of relative positions for conjoint movement, thereby to maintain a constant and selected temperature mixture, and to vary the volume at any such temperature.

4. A mixing valve for use with hot and cold water supply sources having a common discharge outlet, comprising, in combination, hot and cold water valves controlling the supply from the rerespective sources, a rotative member adjustable counterclockwise to open and control the hot water valve, a second rotative member adjustable counterclockwise to control the cold water valve, means operable during a predetermined initial portion of the movement of the first member to engage and move the second member likewise, said interengaging means becoming inoperative following a predetermined advance of the two members, to permit further advance of the hot water member and to permit clockwise return of the cold water member, and ultimate delivery of hot water only.

5. A mixing valve for use with hot and cold water supply sources, having a common discharge outlet, and comprising, in combination, hot and cold water valves controlling the supply from the respective sources, a cam rotatable to open and control the hot water valve, a second cam rotatable to open and control the cold water valve, pin and notch means, one upon one cam and the other upon the other cam, engageable between the cams, but permitting relative adjustment thereof prior to and upon their movement from "off" position to a setting position, and means operable upon further advance of the cams beyond the setting position to lock the pin and notch means against relative adjustment of the cams.

6. A mixing valve for use with hot and cold water supply sources, having a common discharge outlet, and comprising, in combination, hot and cold water valves controlling the supply from the respective sources, a cam rotatable to open and control the hot water valve, a second cam rotatable to open and control the cold water valve, pin and notch means, one upon one cam and the other upon the other cam, engageable between the cams, but permitting relative adjustment thereof prior to and upon their movement from "off" position to a setting position, and a ledge fixed in position to engage the pin, following its advance beyond setting position, and to lock it in engagement with a notch, thus to prevent relative adjustment between and to compel joint movement of the cams.

7. A mixing valve for use with hot and cold water supply sources, having a common discharge outlet, comprising, in combination, hot and cold water valves controlling the supply from the respective sources, a cam rotatable to open and control the hot water valve, a second cam rotatable to open and control the cold water valve, pin and notch means, one upon one cam and the other upon the other cam, engageable between the cams, but permitting relative adjustment thereof prior to and upon their movement from "off" position to a setting position, means operable upon further advance of the cams beyond the setting position to lock the pin and notch means against relative adjustment of the cams, and a second pin upon one cam and a lug upon the other cam engaged thereby when both cams are in "off" position, to insure movement of the cold water cam upon movement of the hot water cam towards open or setting position.

8. A mixing valve for use with hot and cold water supply sources, having a common discharge outlet, comprising, in combination, hot and cold water valves controlling the supply from the respective sources, a cam rotatable to open and control the hot water valve, a second cam rotatable to open and control the cold water valve, pin and notch means, one upon one cam and the other upon the other cam, engageable between the cams, but permitting relative adjustment thereof prior to and upon their movement from "off" position to a setting position, a ledge fixed in position to engage the pin, following its advance beyond setting position, and to lock it in engagement with a notch, thus to prevent relative adjustment between and to compel joint movement of the cams, and a second pin upon one cam and a lug upon the other cam in the path of movement of the second pin, and engaged thereby when both cams are in "off" position (the second pin being then engaged by the ledge) to insure movement of the cold water cam upon movement of the hot water cam away from "off" position, the ledge being of such length, relative to the limits of movement of the cams, that the second pin will be disengaged therefrom at extreme open position, thereby to disengage and permit passage of the lug, and movement of the cold water cam to "off" position.

9. A mixing valve for use with hot and cold water supply sources, having a common discharge outlet, comprising temperature-governing means associated with the supply sources and adjustable to select the desired temperature of the water to be delivered, volume-control means movable from a minimum position to increase the quantity of water delivered, and locking means to prevent regulatory adjustment of said temperature-governing means when said volume-control means is in other than its minimum position.

10. A mixing valve for use with a hot water supply pipe and a cold water supply pipe having a common discharge outlet, comprising, in combination, a valve associated with each pipe for regulating the quantity of flow, means associated with each valve to move the same, said two means being relatively adjustable to select the desired temperature mixture to be delivered, and means to lock together said two first means for joint movement, thus to vary the quantity of water delivered without disturbing the established temperature mixture.

11. A mixing valve for use with a hot water supply source and a cold water supply source, having a common discharge outlet, means controlling delivery of water from the hot water source, means controlling delivery of water from the cold water source, operating mechanism for said two controlling means, operable to select a desired temperature mixture, and further operable to vary the volume of water delivered, and means associated with said two controlling means, operating after selection of such desired temperature mixture, to maintain such selected temperature mixture constant during further operation of said mechanism to vary the volume of water delivered.

12. A mixing valve for use with hot and cold water supply sources, having a common discharge outlet, comprising, in combination, a hot water governor controlling the hot water supply source, a cold water governor controlling the cold water supply source, said two governors being relatively movable to establish a desired temperature mixture to be delivered, means adapted to lock together such hot and cold water governors in such established relation, and means operable by predetermined coincident movement of said governors to hold said locking means in the locked position upon continuance of such movement.

13. A mixing valve for use with a hot water supply source and a cold water supply source, having a common discharge outlet, means controlling delivery of water from the hot water source, means controlling delivery of water from the cold water source, means interdicting delivery movement of said first means prior to delivery movement of said second means, and means cooperating with said first two means to vary the relative movements thereof for regulating the proportions of hot and cold water delivered subsequent to delivery movement of both said first two means.

JOHN E. LUNDEGARD.